April 16, 1963     J. H. SCHNEIDER     3,085,591

EXHALATION VALVE

Filed Aug. 22, 1960

INVENTOR.
JOHN H. SCHNEIDER.
BY Ronald H Shakely
AGENT 3,085,591
EXHALATION VALVE
John H. Schneider, Pittsburgh, Pa., assignor to Mine Safety Appliances Company, Pittsburgh, Pa.
Filed Aug. 22, 1960, Ser. No. 51,031
3 Claims. (Cl. 137—525.3)

This invention relates to a low pressure unidirectional valve, and more particularly to an exhalation valve suitable for use on gas masks and similar structures.

It is an object of this invention to provide an exhalation valve of simple construction that requires a minimum of assembly operations and may be inexpensively manufactured. A further object is to provide an exhalation valve having an integral unitary valve member having both a valve seat and valve head. Another object is to provide an exhalation valve which cannot be incorrectly assembled. Other objects will be apparent to those skilled in the art from the following description and claims.

Broadly, the valve of this invention comprises two members: (1) a body member having an integral valve seat and an integral movably supported resilient disc valve head, and (2) a cap or cover member adapted to engage the body member and move the valve head into closed engagement of the valve seat. In the preferred embodiment of this invention the body member, having both the valve head and valve seat, is molded or otherwise formed in one piece of a resilient material, such as natural or synthetic rubber, or the like.

In the accompanying drawings which are illustrative of a preferred embodiment of this invention:

Figure 1:
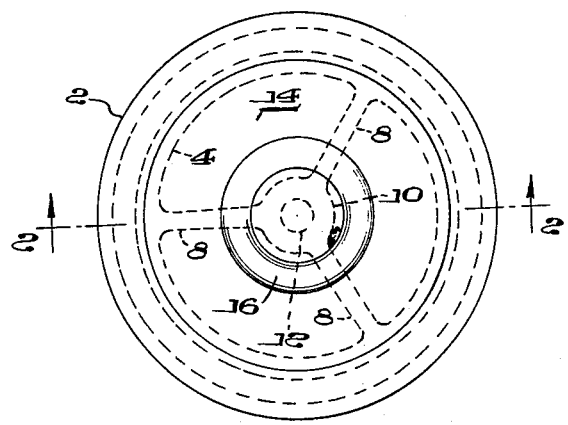
FIG. 1 is a plan view of a unitary valve body member.
Figure 2:
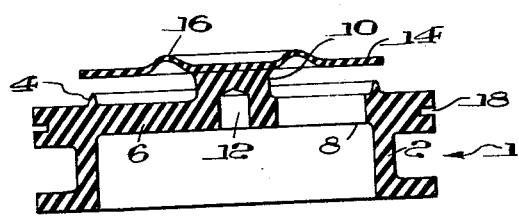
FIG. 2 is a vertical sectional view of the unitary valve body member shown in FIG. 1.

Referring to FIG. 1 and FIG. 2, the body member 1 is preferably molded in one piece from rubber or similar resilient material. The tubular housing 2 is formed with a raised seating surface 4 and carries a spider 6 having legs or spokes 8 and a central body or hub 10. The hub extends beyond the housing 2 and has a cavity 12 to permit its axial displacement, as will be described later, without deforming seating surface 4. A disc valve head 14 carried by hub 10 is of slightly larger diameter than the seat 4, and preferably has a circular bellows 16 of reduced thickness to provide increased flexibility of the disc valve head. The housing 2 is provided with a channel 18, or other means, for receiving a cap member in assembly of the valve.

Figure 3:
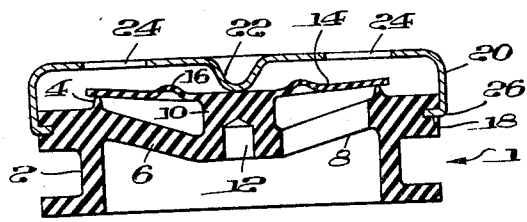
FIG. 3 is a vertical sectional view similar to FIG. 2 with the cap added.

Referring now to FIG. 3, a rigid cap or cover member 20, adapted to be received by the body member 1, has a depression 22 or other means situated to engage hub 10 when assembled. A plurality of ports 24 in the cap 20 are of sufficient area to prevent any appreciable impedance to the outward flow of exhaled gases.

In assembly, the cap member 20 is simply affixed to the body member 1, as by engaging lip 26 into channel 18. The depression 22 in the cap axially displaces hub 10, stretching elastic legs 8, thereby engaging valve seat 4 and resilient disc valve head 14. Thus the valve is completely assembled with just one assembly step, and since the valve head and seat are both formed in an integral piece there is no opportunity for improper assembly of these primary operating elements. Furthermore, proper assembly is readily and easily inspected by external observation to determine if the cap member is properly engaged in the body member.

The valve is adapted to be connected to a gas mask or similar structure by any of the conventional methods. Also, when using gas mask facepieces made of resilient materials, e.g. rubber, the valve body member 1 can be made integral with the facepiece. In operation, the exhalation pressure flexes the disc valve head 14, permitting the exhaled gases to be exhausted through the open valve and exhaust ports 24. The valve can be designed and adjusted to open at any desired pressure simply by adjusting the distance hub 10 is displaced by the cap 20; the further the hub 10 is displaced, the greater the closing force exerted by the distended resilient disc head 14.

As is apparent from the above description, only the legs 8 and the valve head 14 must be formed of resilient material. If preferred, the other portions of the body member, i.e., housing 2, seat 14 and hub 10, may be formed of rigid materials. When the entire body member is formed in one piece from resilient material, these latter mentioned portions are of sufficient thickness so that they are substantially rigid under conditions of use.

Having explained the principle of my invention and described what I now consider to represent its best embodiment, I desire to have it understood that, within the scope of the appended claims, the invention may be practiced otherwise than as specifically illustrated and described.

I claim:

1. A one-way breathing valve comprising a tubular housing having a peripheral valve seat on one end thereof, a spider connected within and extending across said housing, said spider having resilient legs and a hub, said hub extending beyond the end of said housing, a resilient disc valve head connected to said hub and spaced from said valve seat, a cap means adapted to engage said housing and axially displace said hub to a fixed operating position to engage said head and seat, and said valve head flexing in response to a pressure differential across it to disengage from said seat.

2. A one-way breathing valve comprising a one piece body member formed of a resilient material, said body member comprising a tubular housing having a peripheral valve seat on one end thereof, a spider comprising legs and a hub within said housing, said hub extending beyond said housing end, and a disc valve head integral with said hub and spaced from said seat; a cap means adapted to engage said body member and axially displace said hub to a fixed operating position to engage said head and seat, and said valve head flexing in response to a pressure differential across it to disengage from said seat.

3. A one-way breathing valve comprising a one piece body member formed of a resilient material, said body member comprising a tubular housing having a peripheral valve seat on one end thereof, a spider comprising legs and a hub within said housing, said hub extending beyond said housing end, and a disc valve head integral with said hub and spaced from said seat; said body member being adapted to receive a rigid cap member, said cap member having exhaust ports and a protuberance situated to contact and axially displace said hub to a fixed operating position when received by said body member, thereby engaging said head and seat, and said valve head flexing in response to a pressure differential across it to disengage from said seat.

References Cited in the file of this patent
UNITED STATES PATENTS

| | | |
|---|---|---|
| 1,949,058 | Leguillon | Feb. 27, 1934 |
| 2,128,050 | Landis | Aug. 23, 1938 |
| 2,326,651 | Husted | Aug. 10, 1943 |
| 2,661,128 | Rieke | Dec. 1, 1953 |
| 2,856,863 | Folley | Oct. 21, 1958 |
| 2,922,435 | Edwards | Jan. 26, 1960 |
| 2,925,093 | Brand | Feb. 16, 1960 |